US006589499B2

(12) United States Patent
Gao et al.

(10) Patent No.: US 6,589,499 B2
(45) Date of Patent: Jul. 8, 2003

(54) LAYERED LITHIUM COBALT OXIDES FREE OF LOCALIZED CUBIC SPINEL-LIKE STRUCTURAL PHASES AND METHOD OF MAKING SAME

(75) Inventors: Yuan Gao, Ocean, NJ (US); Marina Yakovleva, Gastonia, NC (US); Hugh H. Wang, Brandon, FL (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 09/952,355

(22) Filed: Sep. 12, 2001

(65) Prior Publication Data

US 2002/0018746 A1 Feb. 14, 2002

Related U.S. Application Data

(63) Continuation of application No. 09/439,620, filed on Nov. 12, 1999, now abandoned.
(60) Provisional application No. 60/108,360, filed on Nov. 13, 1998.

(51) Int. Cl.$^7$ ............................ C01D 15/00; C01G 51/00
(52) U.S. Cl. .................. 423/594; 429/218.1; 429/231.3
(58) Field of Search .............................. 423/594, 593, 423/599; 429/231.3, 218.1

(56) References Cited

U.S. PATENT DOCUMENTS

| | | |
|---|---|---|
| 4,366,215 A | 12/1982 | Coetzer et al. |
| 4,507,371 A | 3/1985 | Thackeray et al. |
| 4,567,031 A | 1/1986 | Riley |
| 4,668,595 A | 5/1987 | Yoshino et al. |
| 4,770,960 A | 9/1988 | Nagaura et al. |
| 4,956,247 A | 9/1990 | Miyazaki et al. |
| 5,084,366 A | 1/1992 | Toyoguchi |
| 5,147,738 A | 9/1992 | Toyoguchi |
| 5,160,712 A | 11/1992 | Thackeray et al. |
| 5,168,019 A | 12/1992 | Sugeno |
| 5,169,736 A | 12/1992 | Bittihn et al. |
| 5,180,574 A | 1/1993 | Von Sacken |
| 5,264,201 A | 11/1993 | Dahn et al. |
| 5,286,582 A | 2/1994 | Tahara et al. |
| 5,316,877 A | 5/1994 | Thackeray et al. |
| 5,356,731 A | 10/1994 | Sitters et al. |
| 5,370,949 A | 12/1994 | Davidson et al. |
| 5,429,890 A | 7/1995 | Pynenburg et al. |
| 5,478,671 A | 12/1995 | Idota |
| 5,478,673 A | 12/1995 | Funatsu |
| 5,478,674 A | 12/1995 | Miyasaka |
| 5,478,675 A | 12/1995 | Nagaura |
| 5,487,960 A | 1/1996 | Tanaka |
| 5,506,077 A | 4/1996 | Koksbang |
| 5,518,842 A | 5/1996 | Fey et al. |
| 5,591,543 A | 1/1997 | Peled et al. |
| 5,609,975 A | 3/1997 | Hasegawa et al. |
| 5,618,640 A | 4/1997 | Idota et al. |
| 5,620,812 A | 4/1997 | Tahara et al. |
| 5,626,635 A | 5/1997 | Yamaura et al. |

(List continued on next page.)

FOREIGN PATENT DOCUMENTS

| | | |
|---|---|---|
| CA | 2123489 A1 | 3/1994 |
| DE | 45 117 C1 | 5/1996 |
| EP | 0 646 546 A1 | 4/1995 |
| EP | 0 672 622 A1 | 9/1995 |
| EP | 0 712 172 A2 | 5/1996 |
| EP | 0 717 455 A1 | 6/1996 |
| EP | 0 712 172 A3 | 7/1996 |
| EP | 0 744 381 A1 | 11/1996 |
| EP | 0 840 386 A1 | 5/1998 |
| EP | 0 864 539 A1 | 9/1998 |
| EP | 0 885 845 A1 | 12/1998 |
| JP | 329 263 A | 11/1992 |
| JP | 4329263 A | 11/1992 |
| JP | 4345759 A2 | 12/1992 |
| JP | 6124707 A | 5/1994 |

(List continued on next page.)

OTHER PUBLICATIONS

Ceder et al., The Stability of Orthorhombic and Monoclinic–Layer LiMnO$_2$, *Electrochemical and Solid–State Letters*, (1999), pp. 550–552, 2 (11), no month.

Dahn et al., *Structure and Electrochemistry of Li$_2$Cr$_x$Mn$_{2-x}$O$_4$ for 1.0 $\leq$x$\geq$1.5*, J. Electrochem. Soc., Mar. 1998, pp. 851–859, vol. 145, No. 3.

Jang et al., Stabilization of LiMnO$_2$ in the α–NaFeO$_2$ Structure Type by LiAlO$_2$ Addition, *Electrochemical and Solid–State Letters*, (1998), pp. 13–16, 1 (1), no month.

Wickman et al., Crystallographic and Magnetic Properties of Several Spinels Containing Trivalent JA–1044 Mangase, *J. Phys. Chem. Solids*, Pergamon Press 1958, pp. 351–360, vol. 7, no month.

De Kock et al., The effect of multivalent cation dopants on lithium manganese spinel cathodes, *Journal of Power Sources*, vol. 70, Issue 2, Feb. 1998, pp. 247–252.

Gummow et al., Improved capacity retention in rechargeable 4 V lithium/lithium–manganese oxide (spinel) cells, *Solid State Ionics*, (1994), no month.

Tarascon et al., The Spinel Phase of LiMn$_2$O$_4$ as a Cathode in Secondary Lithium Cells, *J. Electrochem. Soc.*, Oct. 1991, vol. 138, No. 10, pp. 2859–2864.

(List continued on next page.)

*Primary Examiner*—Steven Bos
(74) *Attorney, Agent, or Firm*—Myers Bigel Sibley & Sajovec, PA

(57) ABSTRACT

A compound having the formula Li$_\alpha$Co$_\beta$A$_\gamma$O$_2$, is provided wherein A is one or more dopants having an average oxidation state N such that +2.5$\leq$N$\leq$+3.5, 0.90$\leq\alpha\leq$1.10, $\beta$>0, $\gamma\geq$0 and $\beta+\gamma$=1. The compound has a substantially single phase, hexagonal layered crystal structure and is substantially free of localized cubic spinel-like structural phases, wherein, in the powder x-ray diffraction pattern, there are no diffraction peaks at a smaller scattering angle than the diffraction peak corresponding to Miller indices.

29 Claims, 7 Drawing Sheets

U.S. PATENT DOCUMENTS

| | | |
|---|---|---|
| 5,631,105 A | 5/1997 | Hasegawa et al. |
| 5,648,057 A | 7/1997 | Ueda et al. |
| 5,672,329 A | 9/1997 | Okada et al. |
| 5,672,446 A | 9/1997 | Barker et al. |
| 5,674,645 A | 10/1997 | Amatucci et al. |
| 5,677,087 A | 10/1997 | Amine et al. |
| 5,679,481 A | 10/1997 | Takanishi et al. |
| 5,683,835 A | 11/1997 | Bruce |
| 5,686,203 A | 11/1997 | Idota et al. |
| 5,693,435 A | 12/1997 | Amatucci et al. |
| 5,700,598 A | 12/1997 | Denis et al. |
| 5,718,989 A | 2/1998 | Aoki et al. |
| 5,750,288 A | 5/1998 | Xie et al. |
| 5,759,717 A | 6/1998 | Amine et al. |
| 5,766,800 A | 6/1998 | Manev et al. |
| 5,780,181 A | 7/1998 | Idota et al. |
| 5,783,332 A | 7/1998 | Amine et al. |
| 5,783,333 A | 7/1998 | Mayer |
| 5,789,115 A | 8/1998 | Manev et al. |
| 5,795,558 A | 8/1998 | Aoki et al. |
| 5,858,324 A | 1/1999 | Dahn et al. |
| 5,866,279 A | 2/1999 | Wada et al. |
| 5,879,654 A | 3/1999 | van Ghemen et al. |
| 5,885,544 A | 3/1999 | Yamazaki et al. |
| 5,891,416 A | 4/1999 | Yamazaki et al. |
| 5,900,385 A | 5/1999 | Dahn et al. |
| 5,958,624 A | 9/1999 | Frech et al. |
| 5,965,293 A | 10/1999 | Idota et al. |
| 6,017,654 A | 1/2000 | Kumta et al. |
| 6,048,643 A | 4/2000 | van Ghemen et al. |
| 6,071,645 A | 6/2000 | Biensan et al. |
| 6,080,510 A | 6/2000 | Hemmer et al. |
| 6,117,410 A | 9/2000 | Ogihara et al. |

FOREIGN PATENT DOCUMENTS

| | | |
|---|---|---|
| JP | 7114915 A | 5/1995 |
| JP | 0 7114915 A | 5/1995 |
| JP | 7192721 A | 7/1995 |
| JP | 8264179 A | 1/1996 |
| JP | 8078004 A | 3/1996 |
| JP | 08138649 A | 5/1996 |
| JP | 08138669 A | 5/1996 |
| JP | 08222220 A | 8/1996 |
| JP | 8250120 A | 9/1996 |
| JP | 8287914 A | 11/1996 |
| JP | 09092285 A | 4/1997 |
| JP | 10001316 A | 1/1998 |
| JP | 10027611 A | 1/1998 |
| JP | 10214624 A | 8/1998 |
| JP | 11-16573 | 1/1999 |
| JP | 11079750 A | 3/1999 |
| JP | 11092149 A | 4/1999 |
| WO | WO 97/07555 | 2/1997 |

OTHER PUBLICATIONS

Padhi et al., Ambient and High–Pressure Structure of LiMnVO$_4$ and Its Mn$^{3+}$/Mn$^{2+}$ Redox Energy, *Journal of Solid State Chemistry*, (1997), 128, Article No. SC967217, pp. 267–272, no month.

Amine et al., Preparation and Electrochemical Investigation of LiMn$_{1.5}$Me$_{0.5}$O$_4$ (Me:Ni,Fe) Cathode Materials For Secondary Lithium Batteries, Fundamental Technology Laboratory, Corporate R&D Center, Japan Storage Battery Co., Ltd., 11–B–34, no date.

Amine et al., Preparation and electrochemical investigation of LiMn$_{2-x}$Me$_x$O$_4$ (ME: Ni, Fe, and x=0,5, 1) cathode materials for secondary lithium batteries, *Journal of Power Sources*, 68, (1997), pp. 604–608. no month.

Pistoia et al., Doped Li–Mn Spinels: Physical/Chemical Characteristics and Electrochemical Performance in Li Batteries, *American Chemical Society*, 9, (1997), pp. 1443–1450, no month.

Suzuki et al., Valence Analysis of Transition of Transition Metal Ions in Spinel LiMnMO4(M=Ti, Cr, Mn, Co) by Electron Energy Loss Spectroscopy, *J. Phys. Chem. Solids*, (1996), vol. 57, No. 12, pp. 1851–1856, no month.

Rossen et al., Structure and electrochemistry of Li$_x$Mn$_y$Ni$_{l-y}$O$_2$, *Solid State Ionics*, (1992), pp. 311–318, no month.

Banov et al., Lithium Managanese Cobalt Spinel Cathode for 4V Lithium Batteries, 8$^{th}$ International Meeting on Lithium Batteries, Jun. 16–21, 1996, Nagoya Japan, pp. 452–453.

Moshtev et al., Chemically Desodiated Thiochromites as Cathode Materials in Secondary Lithium Cells, *Journal of Power Sources*, 26, (1989), pp. 285–292, no month.

Hernan et al., Use of Li–M–Mn–O [M=Co, Cr, Ti] spinels prepared by a sol–gel method as cathodes in high–voltage lithium batteries, *Solid State Ionics*, 118, (1999) pp. 179–185, no month.

Armstrong et al., Synthesis of layered LiMnO$_2$ as an electrode for rechargeable lithium batteries, *Nature*, (Jun. 6, 1996), vol. 381, pp. 499–500.

Van Der Ven et al., First–principles investigation of phase stability in Li$_x$CoO$_2$, *The American Physical Society, Physical Review B*, Aug. 1, 1998, vol. 58, No. 6, pp. 2975–2987.

Wang et al., TEM Study of Electrochemical Cycling–Induced Damage and Disorder in LiCoO$_2$ Cathodes for Rechargeable Lithium Batteries, *Journal of The Electrochemical Society*, 146 (2), (1999), pp. 473–480.

Boyle, T.J. et al., Rechargeable Lithium Battery Cathodes. Nonaqueous Synthesis, Characterization and Electrochemical Properties of LiCoO$_2$, Chemistry of Materials, US, American Chemical Society, Washington, vol. 10, No. 8, Aug. 1, 1998, pp. 2270–2276, XP000776652.

Sun, Y–K et al., Synthesis of ultrafine LiCoO$_2$ powders by the sol–gel method, Journal of Materials Science, GB, Chapman and Hall Ltd. London, vol. 31, No. 14, Jul. 15, 1996, pp. 3617–3621, XP00599896.

D. Gryffroy and R.E. Vandenberghe, Cation distribution, cluster structure and ionic ordering of the spinel sereis lithium nickel manganese titanium oxide (LiNi0.5Mn1.5–xTixO4) and lithium nickel magnesium manganese oxide (LiNi0.5–yMgYMn1.5O4): J.Phys. Chem. Solids (1992), 53(6), 777–84 (Abstract only), no month.

D. Gryffroy; R.E. Vandenberghe; and D. Poelman; Optical absorption of nickel (Ni2+ (d8)) and manganese (Mn4+ (d3)) in some spinel oxides; Solid State Commun. (1992), 82(7), 497–500 (Abstract only), no month.

C. Pouillerie, L. Croguennec, PH. Biensan, P. Willmann and C. Delmas; Synthesis and Characterization of New Li Ni$_{l-y}$Mg$_y$O$_2$ Positive Electrode Materials for Lithium–Ion Batteries; Journal of The Electrochemical Society, 147 (6) pp. 2061–2069 (2000), no month.

J.R. Dahn, E.W. Fuller, M. Obrovac and U. Von Sacken; Thermal stability of Li$_x$CoO$_2$, Li$_x$NiO$_2$ ahd λ–MnO$_2$ and consequences for the safety of Li–ion cells; Solid State Ionics 69, pp. 265–270 (1994), no month.

T. Ohzuku, A. Ueda and M. Kouguchi; Synthesis and Characterization of LiAl$_{1/4}$Ni$_{3/4}$O$_2$ (R3m) for Lithium–Ion (Shuttlecock) Batteries; J. Electrochem. Soc., vol. 142, No. 12, pp. 4033–4039, Dec. 1995.

J.N. Reimers, E. Rossen, C.D. Jones and J.R. Dahn; Structure and electrochemistry of $L_iFe_yNi_{l-y}O_2$; Solid State Ionics 61, pp. 335–344 (1993), no month.

T. Ogihara et al.; Preparation of Spherical $LiCoO_2$ Powders by the Ultrasonic Spray Decomposition and Its Application to Cathode Active Material in Lithium Secondary Battery; Journal of the Ceramic Society of Japan, vol. 101, pp. 1128–1132, Oct. 1993.

P. Biensan, J.P. Peres and F. Perton; Optimized Li $Ni_{l-M}M_MO_2$ Materials With Improved Safety and Fading; SAFT Proprietary; ECS Joint International Meeting, Oct. 17–22, 1999.

International Search Report for PCT/US99/26758, mailed 31.03.00, Alex Schmidt.

XRD pattern of sample 2 measured with Cu Kα radiation. Miller indices are labeled on each peak.

LAYERED LITHIUM COBALT OXIDES FREE OF LOCALIZED CUBIC SPINEL-LIKE STRUCTURAL PHASES AND METHOD OF MAKING SAME

CROSS-REFERENCE TO RELATED APPLICATIONS

This application is a continuation of U.S. patent application Ser. No. 09/439,620, filed Nov. 12, 1999, now abandoned, which claims the benefit of provisional application Ser. No. 60/108,360, filed Nov. 13, 1998.

FIELD OF THE INVENTION

The present invention relates to lithium metal oxides for use as positive electrode materials for lithium and lithium-ion secondary batteries, and to methods of making lithium metal oxides.

BACKGROUND OF THE INVENTION

Lithium metal oxides of the formula $LiMO_2$, wherein M is a transition metal, are important cathode (positive electrode) materials for rechargeable lithium and lithium-ion batteries. Examples of $LiMO_2$ compounds include $LiCoO_2$, $LiNiO_2$, and $LiMnO_2$. Presently, $LiCoO_2$ is used in most commercial lithium and lithium-ion batteries as a cathode material.

$LiMO_2$ compounds can have different crystal structures and phases, even within the same compound. For example, $LiCoO_2$ synthesized at greater than 700° C. has a hexagonal layered structure analogous to $\alpha$-$NaFeO_2$. $LiCoO_2$ synthesized at around 400° C., however, has a cubic spinel-like structure analogous to $Li_2Ti_2O_4$. Both structures have essentially the same FCC (face centered cubic) closed packed arrangement for oxygen except the layered structure has a small distortion in the direction perpendicular to the layers. Additionally, the two structures differ in cation arrangement.

It has been determined that the cubic spinel-like $LiCoO_2$ turns into hexagonal layered $LiCoO_2$ when heated to temperatures above 700° C. Therefore, phase transformation between the two structures is possible and the layered structure is energetically favored only at high temperatures. Layered $LiCoO_2$ also has an energetically favored tendency of changing into spinel $LiCo_2O_4$ when 50% of the lithium ions are removed from the $LiCoO_2$ during electrochemical charging. See A. van der Ven et al., Phys, Rev. B 58, 2975 (1998); and H. Wang et al., J. Electrochem. Soc., 146, 473 (1999). The spinel-like $LiCoO_2$ and spinel $LiCo_2O_4$ also have essentially the same atom arrangement except that lithium is at the octahedral 16c site in spinel-like $LiCoO_2$ and at tetrahedral 8a site in spinel $LiCo_2O_4$.

The tendency of the phase transformation from hexagonal layered $LiMO_2$ to cubic spinel-like $LiMO_2$ is not unique to $LiCoO_2$. Layered $LiMnO_2$ also turns into spinel-like $LiMnO_2$ only after a few cycles in an electrochemical cell. Although a cubic spinel-like $LiNiO_2$ has not been experimentally observed, $Li_{0.5}NiO_2$ (50% delithiated $LiNiO_2$) will indeed turn into $LiNi_2O_4$ spinel.

The electrochemical performance of $LiMO_2$ compounds having a cubic spinel-like structure has been found to be particularly poor, especially compared to layered structures. Moreover, the mere presence of the cubic spinel-like structural phase within the layered phase or on the surface of the layered phase has also been found to be detrimental to battery performance. In particular, the presence of cubic spinel-like phases within the layered crystal structure impedes the diffusion of lithium ions during the charge and discharge cycles of the rechargeable lithium or lithium-ion battery. Furthermore, because the cubic spinel-like phase is energetically favored and only kinetic limitations prevent large scale phase transformation, the presence of localized cubic spinel-like structures can act as a seed for phase transformation to readily occur in the $LiMO_2$ compound. Therefore, even the minor presence of cubic spinel-like phases, even at levels that cannot be detected by bulk techniques, such as powder x-ray diffraction (XRD), can cause problems in battery cycling.

SUMMARY OF THE INVENTION

The present invention provides lithium metal oxides that are substantially single-phase compounds having hexagonal layered crystal structures that are substantially free of localized cubic spinel-like structural phases. Therefore, the lithium metal oxides of the invention have more consistent electrochemical performance than prior art compounds. In addition, the lithium metal oxide compounds of the invention have good structural stability and maintain their structure through cycling. Therefore, the lithium metal oxides of the invention are useful for rechargeable lithium and lithium ion secondary batteries.

The lithium metal oxides of the invention have the formula $Li_\alpha M_\beta A_\gamma O_2$, wherein M is one or more transition metals, A is one or more dopants having an average oxidation state N such that $+2.51 \leq N \leq +3.5$, $0.90 \leq \alpha \leq 1.10$ and $\beta+\gamma=1$. As measured using powder x-ray diffraction, the $Li_\alpha M_\beta A_\gamma O_2$ compounds according to the invention preferably have no diffraction peaks at a smaller scattering angle than the diffraction peak corresponding to Miller indices (003). In addition, the ratio of the integrated intensity of the diffraction peak corresponding to Miller indices (110) to the integrated intensity of the diffraction peak corresponding to Miller indices (108) using powder x-ray diffraction is preferably greater than or equal to 0.7, more preferably greater than or equal to 0.8. The ratio of the integrated intensity of the diffraction peak corresponding to Miller indices (102) to the integrated intensity of the diffraction peak corresponding to Miller indices (006) using powder x-ray diffraction is preferably greater than or equal to 1.0, more preferably greater than or equal to 1.2. The average oxidation state of the dopants N is preferably about +3.

In one preferred embodiment of the invention, the $Li_\alpha M_\beta A_\gamma O_2$ compound is $LiCoO_2$. As measured using electron paramagnetic resonance, the $LiCoO_2$ compounds of the invention typically have a change in intensity from the peak at about g=12 to the valley at about g=3 of greater than 1 standard weak pitch unit, and more typically of greater than 2 standard weak pitch units.

In addition to the $Li_\alpha M_\beta A_\gamma O_2$ compounds above, the present invention is also directed to the dilithiated forms of these compounds resulting from the electrochemical cycling of these compounds. Specifically, the present invention includes $Li_{\alpha-x}M_\beta A_\gamma O_2$ compounds wherein $0 \leq x \leq \alpha$ that are derived by electrochemically removing x Li per formula unit from a compound having the formula $Li_\alpha M_\beta A_\gamma O_2$, wherein M is one or more transition metals, A is one or more dopants having an average oxidation state N such that $+2.5 \leq N \leq +3.5$, $0.90 \leq \alpha \leq 1.10$ and $\beta+\gamma=1$. The $Li_{\alpha-x}M_\beta A_\gamma O_2$ compounds are substantially single-phase lithium metal oxide compounds having hexagonal layered crystal structures that are substantially free of localized cubic spinel-like structural phases.

The present invention further includes lithium and lithium ion secondary batteries including a positive electrode comprising a compound having the formula $Li_\alpha M_\beta A_\gamma O_2$, wherein M is one or more transition metals, A is one or more dopants having an average oxidation state N such that $+2.5 \leq N \leq +3.5$, $0.90 \leq \alpha \leq 1.10$ and $\beta+\gamma=1$. The $Li_\alpha M_\beta A_\gamma O_2$ compound used in the positive electrode has a substantially single phase, hexagonal layered crystal structure and is substantially free of localized cubic spinel-like structural phases.

The present invention further includes a method of preparing compounds having a substantially single phase, hexagonal layered crystal structure that are substantially free of localized cubic spinel-like structural phases. A lithium metal oxide having the formula $Li_\alpha M_\beta A_\gamma O_2$, wherein M is one or more transition metals, A is one or more dopants having an average oxidation state N such that $+2.5 \leq N \leq +3.5$, $0.90 \leq \alpha \leq 1.10$ and $\beta+\gamma=1$, is provided at a temperature of at least about 600° C., and preferably of greater than 800° C. The lithium metal oxide is then cooled at a rate of greater than 8° C./min, preferably between 8° C./min and 140° C./min, more preferably between 10° C./min and 100° C./min. The lithium metal oxide can be synthesized at a temperature of at least about 600° C., and preferably of greater than 800° C., and then cooled at these rates, or the lithium metal oxide can be previously synthesized, heated to a temperature of at least about 600° C., and preferably of greater than 800° C., and then cooled at these rates. The lithium metal oxide is preferably uniformly cooled to provide homogeneity throughout the material being produced.

In a preferred method embodiment of the invention, the $Li_\alpha M_\beta A_\gamma O_2$ compound is $LiCoO_2$ and is prepared by the method of the invention using a lithium source compound and a cobalt source compound. In particular, the preferred lithium source compound is selected from the group consisting of $Li_2CO_3$ and LiOH and the preferred cobalt source compound is selected from the group consisting of $Co_3O_4$ and $Co(OH)_2$. More preferably, the $LiCoO_2$ is prepared from $Li_2CO_3$ and $Co_3O_4$.

These and other features and advantages of the present invention will become more readily apparent to those skilled in the art upon consideration of the following detailed description and accompanying drawings, which describe both the preferred and alternative embodiments of the present invention.

DETAILED DESCRIPTION OF THE PREFERRED EMBODIMENTS OF THE INVENTION

Figure 1:
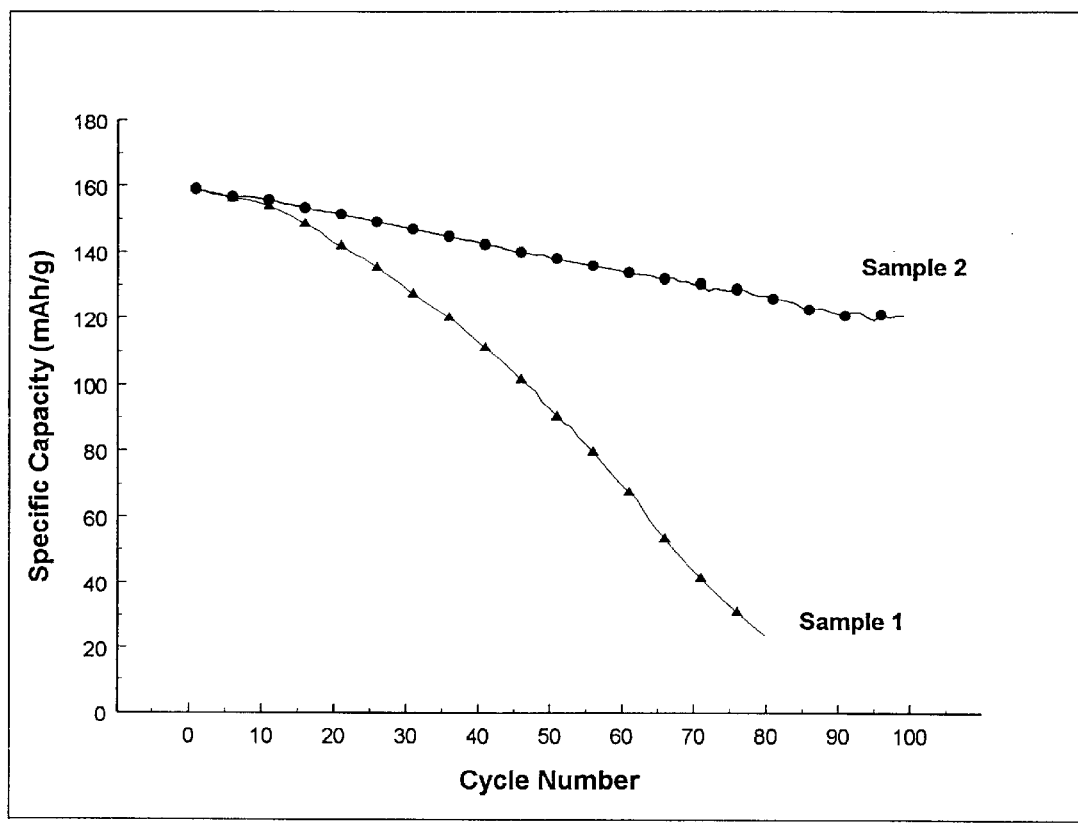
FIG. 1 is a graph comparing the cycle performance between a comparative compound (sample 1) and a compound according to the invention (sample 2).

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings.

The present invention is directed to substantially single-phase lithium metal oxide compounds having hexagonal layered crystal structures that are substantially free of localized cubic spinel-like structural phases on the surface of the crystal or within the crystal. The lithium metal oxides of the invention have the formula $Li_\alpha M_\beta A_\gamma O_2$, wherein M is one or more transition metals, A is one or more dopants having an average oxidation state N such that $+2.5 \leq N \leq +3.5$, $0.90 \leq \alpha \leq 1.10$, $\beta>0$, $\gamma>0$ and $\beta+\gamma=1$. Preferably, the transition metal M is Ni, Co, Mn, or combinations thereof.

The dopants A are elements other than M selected to produce an oxidation state N wherein $+2.5 \leq N \leq +3.5$, and preferably N is about 3. As would be readily understood by those skilled in the art, the average oxidation state N is based on the molar amounts of the dopants used and the valences of the dopants used. For example, if the dopants are 40% $Ti^{4+}$ and 60% $Mg^{2+}$, on a molar basis, the average oxidation state N would be $(0.4)(+4)+(0.6)(+2)=+2.8$.

As defined above, the dopants A are used to replace the transition metal M and are not used to take the place of lithium ions in the lithium metal oxide, i.e., $\beta=1-\gamma$. Therefore, the reversible capacity is maximized in the intercalation compounds of the invention. Exemplary dopants for use in the invention include metals and nonmetals such as Ti, Zr, Mg, Ca, Sr, Ba, Al, Ga, Si, Ge, Sn and combinations thereof. For example, A can include equal amounts of dopants $Ti^{4+}$ and $Mg^{2+}$. Typically, in the compounds of the invention, $\gamma$ is greater than or equal to 0 and less than about 0.5.

The substantially single-phase, hexagonal layered structures of the compounds of the invention can be characterized, for example, by their powder x-ray diffraction patterns. Typically, as measured using powder x-ray diffraction, the $Li_\alpha M_\beta A_\gamma O_2$ compounds according to the invention preferably have no diffraction peaks at a smaller scattering angle than the diffraction peak corresponding to Miller indices (003) thereby demonstrating that the compounds of the invention are substantially single phase. In addition, the ratio of the integrated intensity of the diffraction peak corresponding to Miller indices (110) to the integrated intensity of the diffraction peak corresponding to Miller indices (108) using powder x-ray diffraction is preferably greater than or equal to 0.7, more preferably greater than or equal to 0.8. The ratio of the integrated intensity of the diffraction peak corresponding to Miller indices (102) to the integrated intensity of the diffraction peak corresponding to Miller indices (006) using powder x-ray diffraction is preferably greater than or equal to 1.0, more preferably greater than or equal to 1.2. The integrated intensities for these measurements is based on the area measured below the respective peaks. Alternatively, the heights of the peaks can be used to provide a rough comparison of the integrated intensities and because the widths of the peaks are relatively uniform, the ratios of peak heights are approximately equal to the ratios of the integrated intensities for the two peaks being compared.

In one preferred embodiment of the invention, the $Li_\alpha M_\beta A_\gamma O_2$ compound is $LiCoO_2$. As measured using electron paramagnetic resonance, the $LiCoO_2$ compounds of the invention typically have a change in intensity from the peak at about g=12 to the valley at about g=3 of greater than 1 standard weak pitch unit, and more typically of greater than 2 standard weak pitch units. In particular, FIG. 4, which is discussed in more detail in the examples, illustrates the change of intensity in this region of the EPR graph.

Furthermore, although $LiCoO_2$ is described as preferred, the present invention applies to compounds of the formula $Li_\alpha M_\beta A_\gamma O_2$ other than $LiCoO_2$. In particular, as would be readily understood by those skilled in the art, the other lithium metal oxides of the above formula (e.g., wherein M is Ni or Mn) have a layered crystal structure similar to $LiCoO_2$. Therefore, the present invention applies to these $LiMO_2$ compounds in general and suppressing the formation or transformation of the cubic spinel-like phases within the crystal or on the surface of the crystal, thereby enhancing the performance of the material in a lithium or lithium-ion secondary battery.

The present invention further includes a method of preparing compounds having a substantially single phase, hexagonal layered crystal structure that are substantially free of localized cubic spinel-like structural phases. In accordance with this method, a lithium metal oxide is provided having the formula $Li_\alpha M_\beta A_\gamma O_2$, wherein M is one or more transition metals, A is one or more dopants having an average oxidation state N such that $+2.5 \leq N \leq +3.5$, $0.90 \leq \alpha \leq 1.10$ and $\beta+\gamma=1$, at a temperature of at least about 600° C., and preferably of greater than 800° C. The lithium metal oxide can be provided at these temperatures by either synthesizing the material at these temperatures or by heating previously synthesized material.

The lithium metal oxide compounds of the invention can be prepared or synthesized by mixing together stoichiometric amounts of source compounds containing lithium, M and A to give the desired molar ratio for the formula $Li_\alpha M_\beta A_\gamma O_2$ described above. The source compounds (raw materials) can be the pure elements but are typically compounds containing the elements such as oxides or salts thereof For example, the source compounds are typically hydrated or anhydrous oxides, hydroxides, carbonates, nitrates, sulfates, chlorides or fluorides, but can be any other suitable source compound that will not cause elemental defects in the resulting lithium metal oxide compound. The elements for the lithium metal oxide compound can each be supplied from separate source compounds or at least two of the elements can be supplied from the same source compounds. In addition, the source compounds can be mixed in any desirable order.

Although the lithium metal oxide compounds are preferably prepared by solid state reactions, it can be advantageous to react the raw materials using wet chemistry such as sol-gel type reactions or spray drying techniques, alone or in combination with solid state reactions. For example, the source compounds comprising the M and A can be prepared as a solution in a solvent such as water and the M and A precipitated out of solution as an intimately mixed compound such as a hydroxide. The mixed compound can then be blended with a lithium source compound. The reaction mixture can also be prepared by suspending source compounds in a solution of other source compounds and spray drying the resulting slurry to obtain an intimate mixture. Typically, the selection of reaction methods will vary depending on the raw materials used and the desired end product.

In a preferred method embodiment of the invention, wherein M is Co, the lithium metal oxide (e.g. $LiCoO_2$) is prepared using a lithium source compound and a cobalt source compound. In particular, the preferred lithium source compound is selected from the group consisting of $Li_2CO_3$ and LiOH and the preferred cobalt source compound is selected from the group consisting of $Co_3O_4$ and $Co(OH)_2$. More preferably, the $LiCoO_2$ is prepared from $Li_2CO_3$ and $Co_3O_4$.

The mixture once prepared can be reacted to form the lithium metal oxide. Preferably, the mixture is reacted by firing the mixture at a temperature between 600° C. and 1000° C. for sufficient time to produce the lithium metal oxide compound in a single phase. The mixture is generally fired for a total of between about 4 and about 48 hours in one or more firing steps. Any suitable apparatus can be used for firing the mixture, such as a rotary calciner, a stationary furnace or a tunnel furnace, that uniformly heats the source compounds to produce the lithium metal oxide.

Once the lithium metal oxide is at its final preparation temperature or after previously synthesized lithium metal oxide has been reheated, the lithium metal oxide is cooled at a rate of greater than 8° C./min, preferably between 8° C./min and 140° C./min, more preferably between 10° C./min and 100° C./min. It has been discovered that cooling at a rate of greater than 140° C./min results in a structure with high crystalline stress and strain that does not have the strength of lithium metal oxides cooled at a rate of between 8° C./min and 140° C./min. Moreover, it has been discovered that cooling at a rate of less than 8° C./min results in the formation of localized cubic spinel-like structural phases on the surface of the crystal or within the crystal and thus decreased electrochemical performance. With the lithium metal oxides of the invention, the lack of localized heterostructural phases, e.g., cubic spinel-like phases, within the crystal and on the crystal surface does not induce further phase transformation that impedes the diffusion of the $Li^+$ ions during the charge and discharge cycles. Thus, the hexagonal layered compounds of the invention have better and more consistent electrochemical performance than prior art compounds that are cooled at slower rates.

The lithium metal oxide is preferably uniformly cooled (quenched) in accordance with the invention. In particular, the lithium metal oxide material is preferably cooled at approximately the same rate. For example, the variation between the mean cooling rate and the cooling rate for any specific portion of the material should be less than about 10 percent. In a preferred embodiment of the invention, uniform cooling can be accomplished using a rotary calciner, or a stationary furnace or tunnel furnace with smaller bed depths. The uniformly cooled material prepared according to the invention has greater homogeneity and less variance in its material properties than material that is not uniformly cooled.

The present invention further includes lithium and lithium ion secondary batteries that include a positive electrode comprising the lithium metal oxides of the invention. Typically, the lithium metal oxide compound of the invention is combined with a carbonaceous material and a binder polymer to form a cathode. The negative electrode of the lithium battery can be lithium metal or alloys, or any material capable of reversibly lithiating and delithiating at an electrochemical potential relative to lithium metal between about 0.0 V and 0.7 V. Examples of negative electrode materials include carbonaceous materials containing H, B, Si and Sn; tin oxides; tin-silicon oxides; and composite tin alloys. The negative electrode is separated from the positive electrode material in the cell using an electronic insulating separator. The electrochemical cell further includes an electrolyte. The electrolyte can be non-aqueous liquid, gel or solid and preferably comprises a lithium salt, e.g., $LiPF_6$. Electrochemical cells using the lithium metal oxide compounds of the invention as positive electrode material can be combined for use in portable electronics such as cellular phones, camcorders, and laptop computers, and in large power applications such as for electric vehicles and hybrid electric vehicles.

The lithium metal oxide compounds of the invention allow lithium ions to readily diffuse during both the charge and discharge cycles of the battery. In particular, in the discharge cycle for these lithium metal oxides wherein x Li per formula unit are electrochemically removed per formula unit, the lithium metal oxide takes the formula $Li_{\alpha-x}M_\beta A_\gamma O_2$, wherein $0 \leq x \leq \alpha$.

The lithium metal oxide compounds of the invention have been found to have good initial specific capacities and good cycleability as is desired in the art. For example, the initial specific capacity of the $LiCoO_2$ of the invention is greater than 140 mAh/g, preferably greater than 150 mAh/g. In addition, the capacity loss over 100 cycles for the lithium metal oxides of the invention is less than 25%, preferably less than 20%, with a constant current of C/3 (3 hours for complete charge or discharge) when cycled between 3.0 and 4.3 V versus lithium.

The present invention will now be further demonstrated by the following non-limiting examples.

EXAMPLE 1

A commercial $LiCoO_2$ sample (sample 1) was heated to 950° C. for 1 hour and then quench cooled by taking the sample directly from the hot zone and spreading the sample onto a stainless steel pan at room temperature. The cooling time was estimated at about 10 minutes from 950° C. to room temperature. Sample 1 and the quenched sample (sample 2) were used as positive electrode materials for different electrochemical cells, each cell using a coin cell configuration with Li metal as the negative electrode. NRC 2325 coin cell hardware and CELGARD 3501 polypropylene separators (commercially available from Hoechst Celanese) were used. The electrolyte was 1M $LiPF_6$ in a 50:50 mixture of ethylene carbonate and dimethyl carbonate solvents. The positive electrode consisted of 85% active material (by weight), 10% SUPER S™ carbon black (commercially available from Chemetals Inc.) and 5% polyvinylidene fluoride (PVDF) as a binder polymer, coated on aluminum foil. The cycle tests were conducted between 3.0 and 4.3 V using a constant current of C/3 (3 hours for complete charge or discharge) in both charge and discharge.

FIG. 1 compares the cycle performance of sample 1 and sample 2. As shown in FIG. 1, sample 2 retains more capacity upon cycling than sample 1 and has much improved cycle performance over sample 1.

Figure 2:
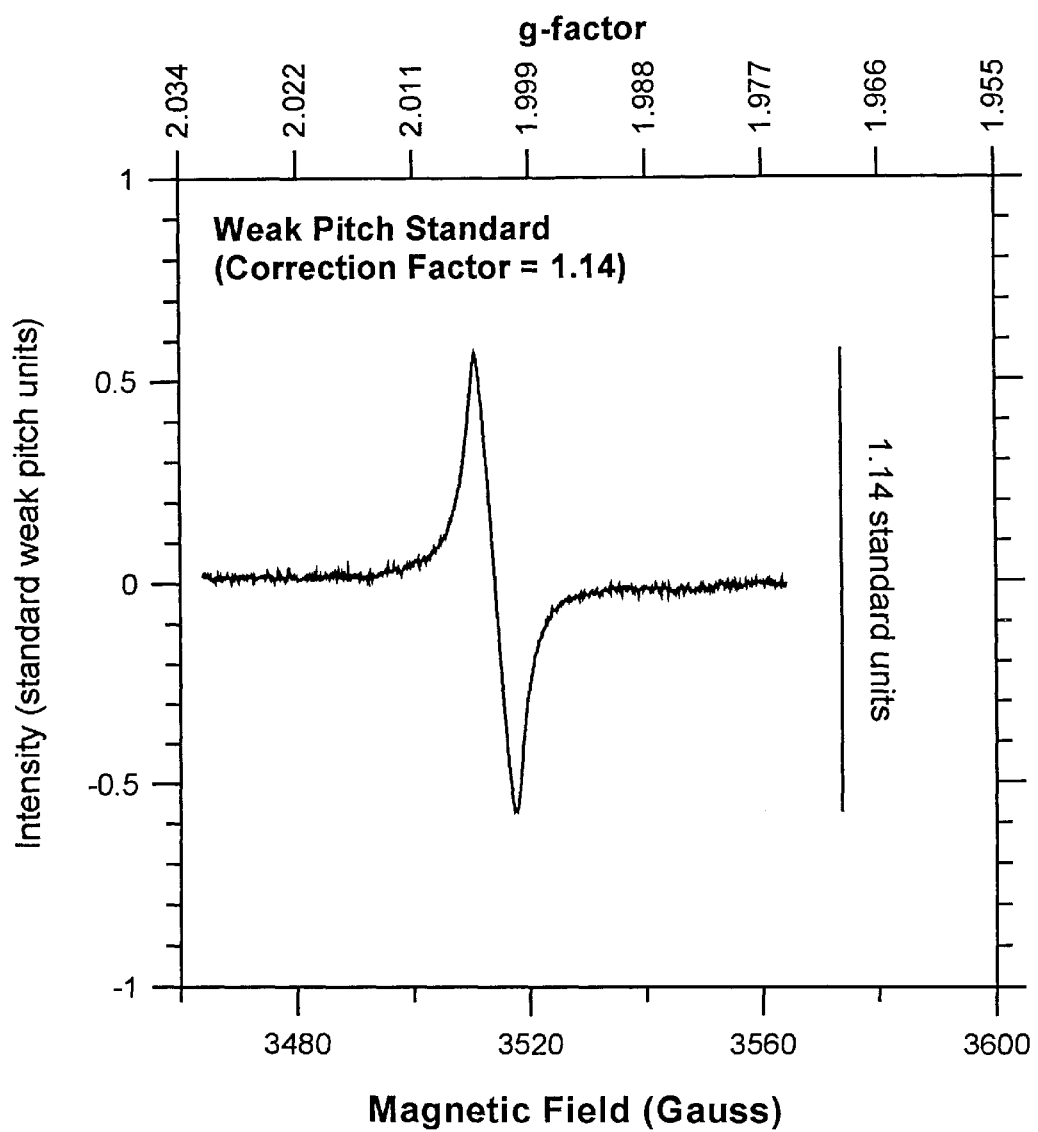
FIG. 2 is a graph illustrating the electron paramagnetic resonance (EPR) spectrum of a weak pitch standard sample with a correction factor of 1.14.

In addition, electron paramagnetic resonance (EPR) spectra of sample 1 and sample 2 were obtained using a Bruker Instruments EMX system. The sweep of the magnetic field was from 100 to 5100 Gauss, and the microwave frequency was fixed at 9.85 GHz. A Bruker Instruments' weak pitch standard (0.0035% pitch in KCl) with a correction factor of 1.14 was used to calibrate the intensity. FIG. 2 shows the EPR spectrum from this standard. The intensity of the carbon feature from this standard, as shown in FIG. 2, is defined as 1.14 standard weak pitch units.

Figure 3:
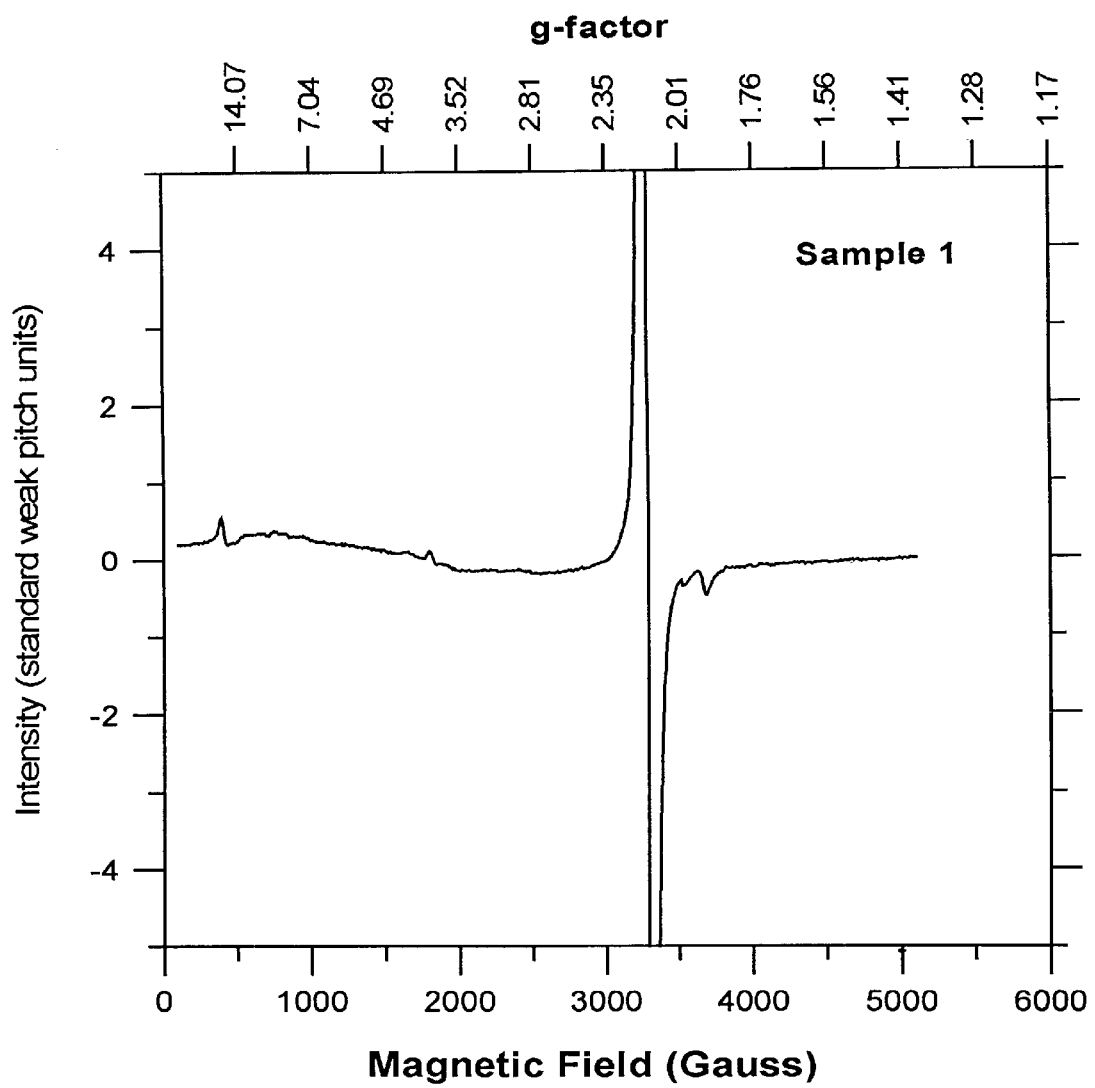
FIG. 3 is a graph illustrating the EPR spectrum of a comparative compound (sample 1).
Figure 4:
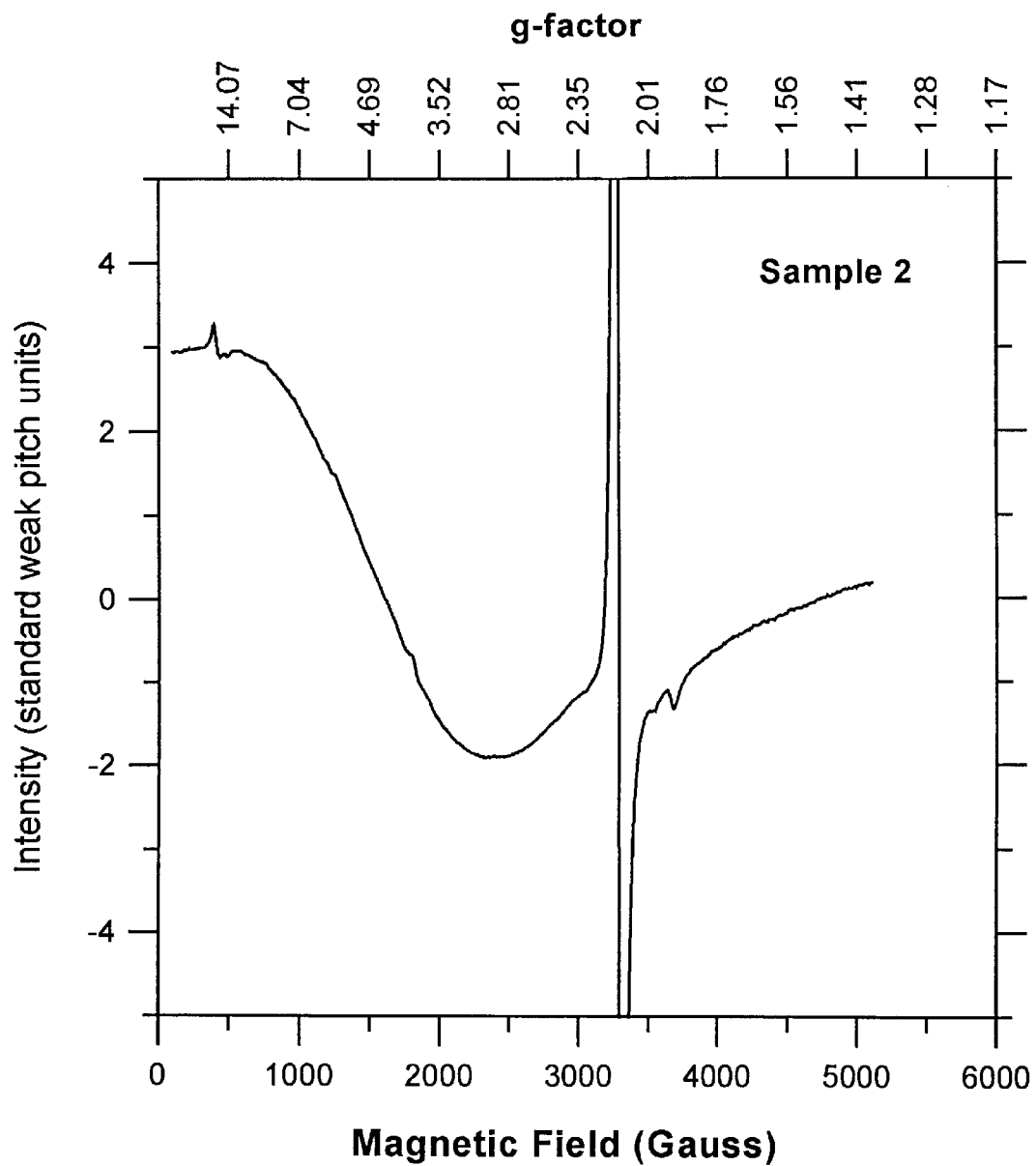
FIG. 4 is a graph illustrating the EPR spectrum of a compound according to the invention (sample 2).

The $LiCoO_2$ samples (sample 1 and sample 2) were directly packed into EPR tubes without dilution for the measurement. The resulting EPR spectra of samples 1 and 2 are shown in FIGS. 3 and 4, respectively. The sharp feature in both FIGS. 3 and 4 at around g=2.14 is due to nickel impurities. The broad feature from about g=14 to about g=2.5 in FIG. 4 is due to the high spin cobalt that is characteristic of the $LiCoO_2$ prepared according to the invention.

Figure 5:
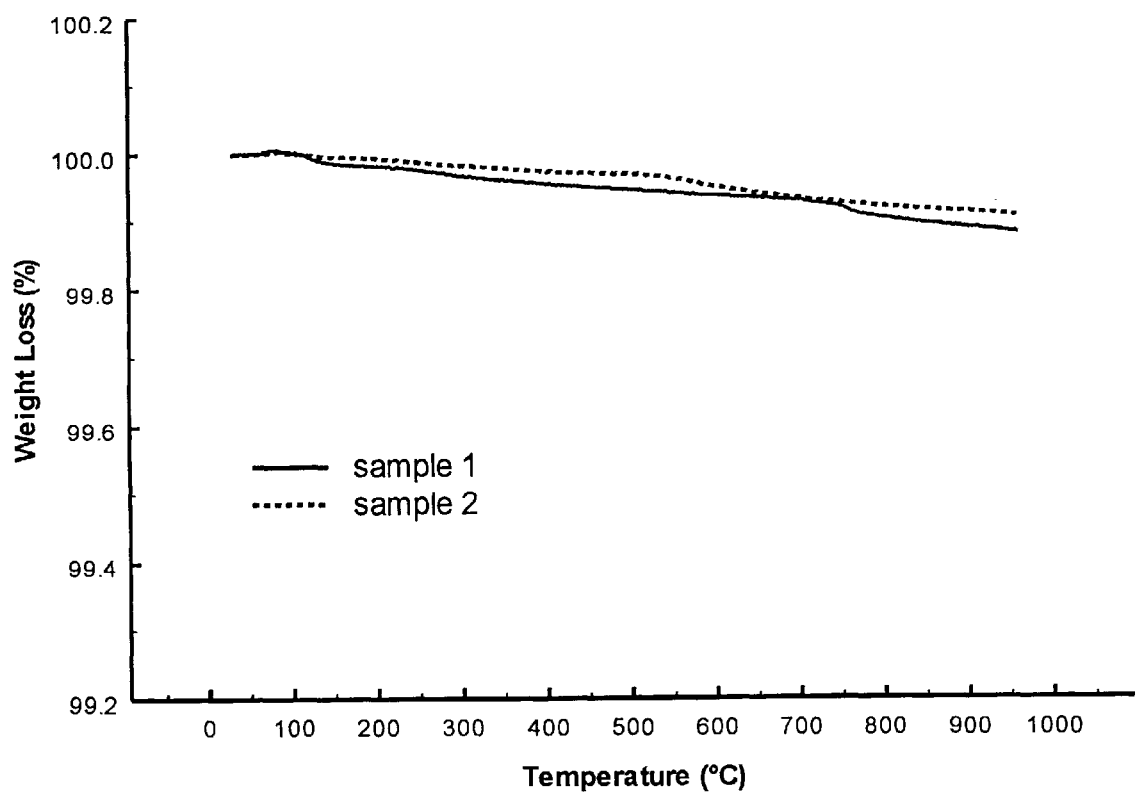
FIG. 5 is a graph illustrating thermogravimetric analysis (TGA) curves for a comparative compound (sample 1) and a compound according to the invention (sample 2).

Thermogravimetric analysis (TGA) of samples 1 and 2 were also conducted. As shown in FIG. 5, neither sample 1 nor sample 2 has any significant weight loss in the range of 650 to 900° C.

Figure 6:
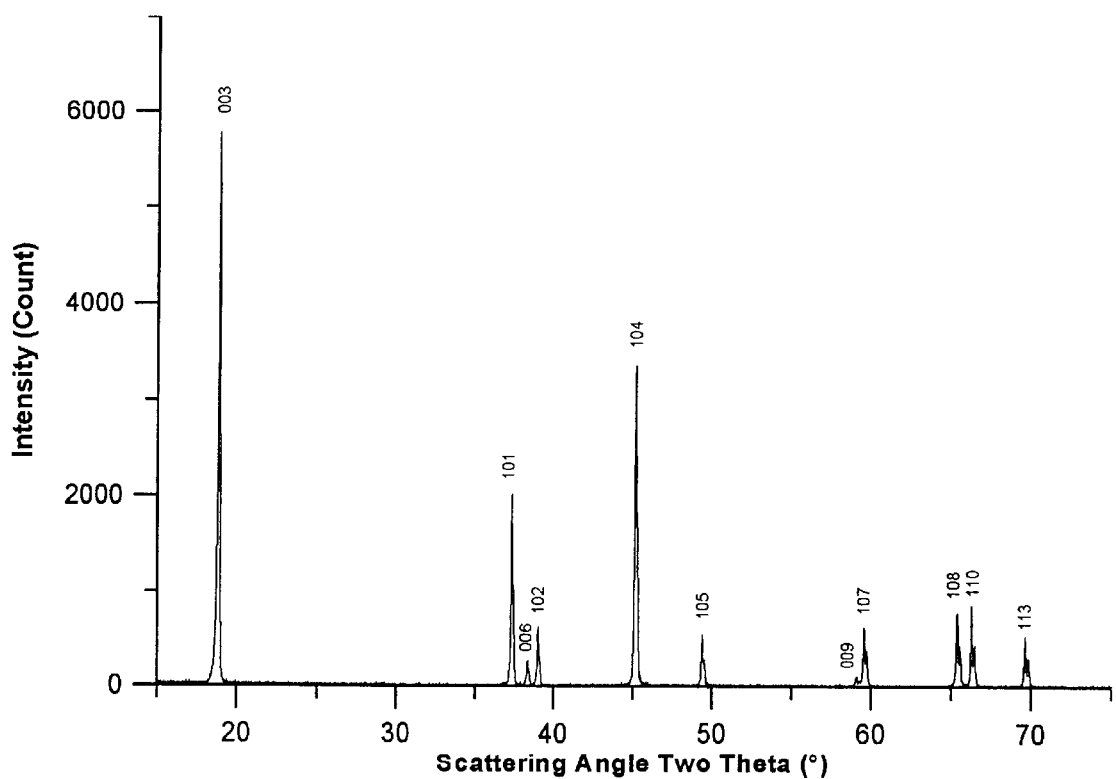
FIG. 6 is a powder x-ray diffraction pattern for a compound according to the invention (sample 2) using Cu Kα radiation.

Sample 2 prepared according to the invention was further tested using powder x-ray diffraction with Cu Kα radiation to determine if this material had a substantially single-phase, hexagonal layered structure. As shown in FIG. 6, sample 2 has a ratio of the integrated intensity of the diffraction peak corresponding to Miller indices (110) to the integrated intensity of the diffraction peak corresponding to Miller indices (108) using powder x-ray diffraction greater than or equal to 0.7, a ratio of the integrated intensity of the diffraction peak corresponding to Miller indices (102) to the integrated intensity of the diffraction peak corresponding to Miller indices (006) using powder x-ray diffraction greater than or equal to 1.0, and no diffraction peaks using powder x-ray diffraction at a smaller scattering angle than the diffraction peak corresponding to Miller indices (003), as desired in accordance with the invention.

EXAMPLE 2

Stoichiometric amounts of $Li_2CO_3$ and $Co_3O_4$ were mixed and then heated at a rate of 3.75° C./min from room temperature to 950° C., held at 950° C. for 5 hours, and then cooled to room temperature at a rate of about 3.7° C./min (total cooling time slightly longer than 4 hours). The resulting compound is sample 3.

Stoichiometric amounts of $Li_2CO_3$ and $Co_3O_4$ were mixed and then heated at a rate of 3.75° C./min from room temperature to 950° C., held at 950° C. for 5 hours, and then cooled to room temperature at a rate of about 8° C./min (total cooling time just under 2 hours). The resulting compound is sample 4.

Figure 7:
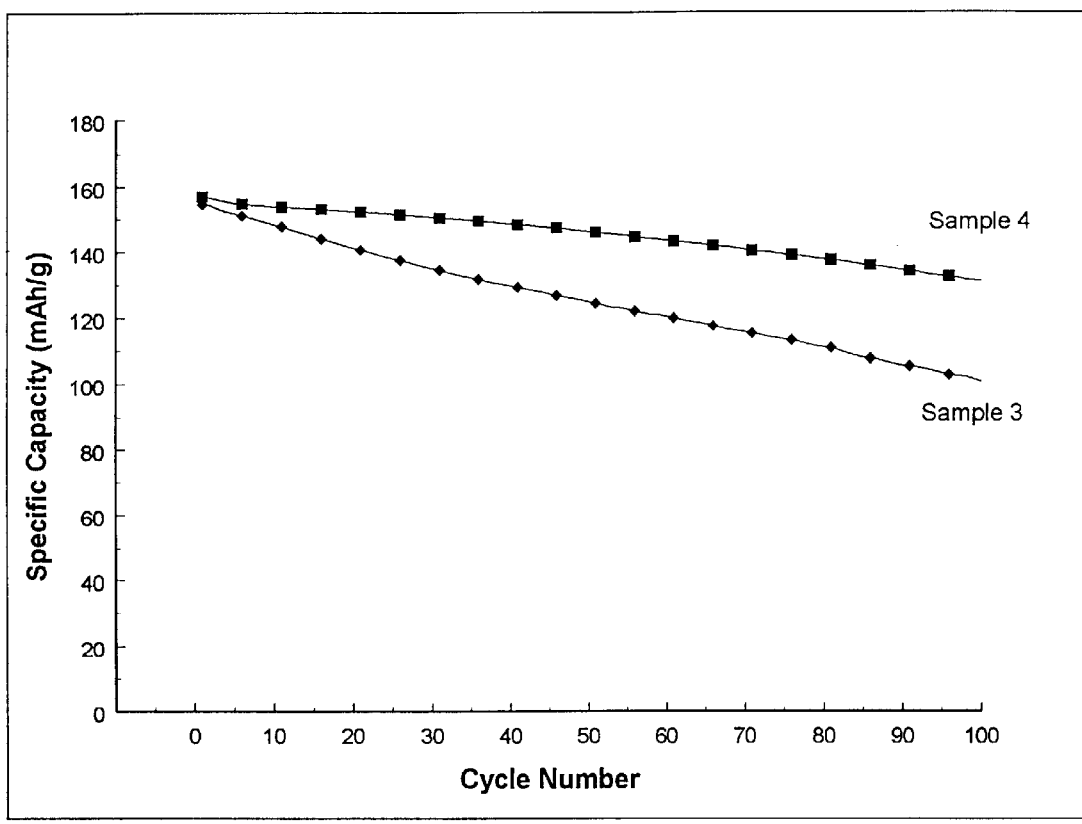
FIG. 7 is a graph comparing the cycle performance of a comparative compound (sample 3) and a compound according to the invention (sample 4).

Samples 3 and 4 were cycle tested according to the method described in Example 1. FIG. 7 compares the cycle performance of sample 3 and sample 4. As shown in FIG. 7, sample 4 prepared according to the invention has better cycling performance than sample 3.

It is understood that upon reading the above description of the present invention and reviewing the accompanying drawings, one skilled in the art could make changes and variations therefrom. These changes and variations are included in the spirit and scope of the following appended claims.

That which is claimed:

1. A compound having the formula $Li_\alpha Co_\beta A_\gamma O_2$, wherein A is one or more dopants having an average oxidation state N such that $+2.5 \leq N \leq +3.5$, $0.90 \leq \alpha \leq 1.10$, $\beta > 0$, $\gamma \geq 0$ and $\beta + \gamma = 1$, said compound having a substantially single phase, hexagonal layered crystal structure and being substantially free of localized cubic spinel-like structural phases and wherein, in the powder x-ray diffraction pattern, there are no diffraction peaks at a smaller scattering angle than the diffraction peak corresponding to Miller indices (003).

2. The compound according to claim 1, wherein the ratio of the integrated intensity of the diffraction peak corresponding to Miller indices (110) to the integrated intensity of the diffraction peak corresponding to Miller indices (108) using powder x-ray diffraction is greater than or equal to 0.7.

3. The compound according to claim 1, wherein the ratio of the integrated intensity of the diffraction peak corresponding to Miller indices (110) to the integrated intensity of the diffraction peak corresponding to Miller indices (108) using powder x-ray diffraction is greater than or equal to 0.8.

4. The compound according to claim 1, wherein the ratio of the integrated intensity of the diffraction peak corresponding to Miller indices (102) to the integrated intensity of the diffraction peak corresponding to Miller indices (006) using powder x-ray diffraction is greater than or equal to 1.0.

5. The compound according to claim 1, wherein the ratio of the integrated intensity of the diffraction peak corresponding to Miller indices (102) to the integrated intensity of the diffraction peak corresponding to Miller indices (006) using powder x-ray diffraction is greater than or equal to 1.2.

6. The compound according to claim 1 having the formula $LiCoO_2$.

7. The compound according to claim 6, wherein the intensity change from the peak at about g=12 to the valley at about g=3 using electron paramagnetic resonance is greater than 1 standard weak pitch unit.

8. The compound according to claim 6, wherein the intensity change from the peak at about g=12 to the valley at about g=3 using electron paramagnetic resonance is greater than 2 standard weak pitch units.

9. The compound according to claim 1 wherein the average oxidation state N of the dopants is about +3.

10. A compound having the form $Li_\alpha Co_\beta A_\gamma O_2$, wherein A is one or more dopants having an average oxidation state N such that $+2.5 \leq N \leq +3.5$, $0.90 \leq \alpha \leq 1.10$, $\beta > 0$, $\gamma \geq 0$, and $\beta + \alpha = 1$, said compound having a substantially single phase, hexagonal layered crystal structure that is substantially free of localized cubic spinel-like structural phases, a ratio of the integrated intensity of the diffraction peak corresponding to Miller indices (110) to the integrated intensity of the diffraction peak corresponding to Miller indices (108) using powder x-ray diffraction greater than or equal to 0.7, a ratio of the integrated intensity of the diffraction peak corresponding to Miller indices (102) to the integrated intensity of the diffraction peak corresponding to Miller indices (006) using powder x-ray diffraction greater than or equal to 1.0, and no diffraction peaks using powder x-ray diffraction at a smaller scattering angle than the diffraction peak corresponding to Miller indices (003).

11. The compound according to claim 10 having the formula $LiCoO_2$.

12. A compound having the formula $Li_{\alpha-x} Co_\beta A_\gamma O_2$, wherein $0 \leq x \leq \alpha$, said compound derived by electrochemically removing x Li per formula unit from a compound having the formula $Li_\alpha Co_\beta A_\gamma O_2$, wherein A is one or more dopants having an average oxidation state N such that $+2.5 \leq N \leq +3.5$, $0.90 \leq \alpha \leq 1.10$, $\beta > 0$, $\gamma \geq 0$ and $\beta + \gamma = 1$, said compound having a substantially single phase, hexagonal layered crystal structure and being substantially free of localized cubic spinel-like structural phases and wherein, in the powder x-ray diffraction pattern, there are no diffraction peaks at a smaller scattering angle than the diffraction peak corresponding to Miller indices (003).

13. A lithium or lithium ion secondary battery including a positive electrode comprising a compound having the formula $Li_\alpha Co_\beta A_\gamma O_2$, wherein A is one or more dopants having an average oxidation state N such that $+2.5 \leq N \leq +3.5$, $0.90 \leq \alpha \leq 1.10$, $\beta > 0$, $\gamma \geq 0$ and $\beta + \gamma = 1$, said compound having a substantially single phase, hexagonal layered crystal structure and being substantially free of localized cubic spinel-like structural phases and wherein, in the powder x-ray diffraction pattern, there are no diffraction peaks at a smaller scattering angle than the diffraction peak corresponding to Miller indices (003).

14. A method of preparing a compound having a substantially single phase, hexagonal layered crystal structure, being substantially free of localized cubic spinel-like structural phases and having no diffraction peaks at a smaller scattering angle than the diffraction peak corresponding to Miller indices (003) in its powder x-ray diffraction pattern, the method comprising the steps of synthesizing a lithium metal oxide having the formula $Li_\alpha Co_\beta A_\gamma O_2$, wherein A is one or more dopants having an average oxidation state N such that $+2.5 \leq N \leq +3.5$, $0.90 \leq \alpha \leq 1.10$, $\beta > 0$, $\gamma \geq 0$ and $\beta + \gamma = 1$, at a temperature of at least about 600° C.; and cooling the heated lithium metal oxide to room temperature at a rate of greater than 8° C./min; wherein said synthesizing step comprises synthesizing the lithium metal oxide from a cobalt source compound selected from the group consisting of $Co_3O_4$ and $Co(OH)_2$.

15. The method according to claim 14, wherein said cooling step comprises cooling the lithium metal oxide at a rate of greater than 10° C./min.

16. The method according to claim 14, wherein said cooling step comprises cooling the lithium metal oxide at a rate of between 8° C./min and 140° C./min.

17. The method according to claim 14, wherein said cooling step comprises cooling the lithium cobalt oxide at a rate of between 10° C./min and 100° C./min.

18. The method according to claim 14, wherein said synthesizing step comprises synthesizing the lithium cobalt oxide at a temperature of at least about 800° C.

19. The method according to claim 14, wherein said cooling step comprises uniformly cooling the lithium cobalt oxide.

20. The method according to claim 14, wherein said synthesizing step comprises synthesizing the lithium cobalt oxide from a lithium source compound selected from the group consisting of $Li_2CO_3$ and LiOH.

21. The method according to claim 14, wherein said synthesizing step comprises synthesizing the lithium cobalt oxide from $Li_2CO_3$ and $Co_3O_4$.

22. The method according to claim 14, wherein in the lithium metal oxide, the ratio of the integrated intensity of the diffraction peak corresponding to Miller indices (110) to the integrated intensity of the diffraction peak corresponding to Miller indices (108) using powder x-ray diffraction is greater than or equal to 0.7.

23. The method according to claim 14, wherein in the lithium metal oxide, the ratio of the integrated intensity of the diffraction peak corresponding to Miller indices (110) to the integrated intensity of the diffraction peak corresponding to Miller indices (108) using powder x-ray diffraction is greater than or equal to 0.8.

24. The method according to claim 14, wherein in the lithium metal oxide, the ratio of the integrated intensity of the diffraction peak corresponding to Miller indices (102) to the integrated intensity of the diffraction peak corresponding to Miller indices (006) using powder x-ray diffraction is greater than or equal to 1.0.

25. The method according to claim 14, wherein in the lithium metal oxide, the ratio of the integrated intensity of the diffraction peak corresponding to Miller indices (102) to the integrated intensity of the diffraction peak corresponding to Miller indices (006) using powder x-ray diffraction is greater than or equal to 1.2.

26. The method according to claim 14, wherein the lithium metal oxide has the formula $LiCoO_2$.

27. The method according to claim 14, wherein in the lithium metal oxide, the intensity change from the peak at about g=12 to the valley at about g=3 using electron paramagnetic resonance is greater than 1 standard weak pitch unit.

28. The method according to claim 14, wherein in the lithium metal oxide, the intensity change from the peak at about g=12 to the valley at about g=3 using electron paramagnetic resonance is greater than 2 standard weak pitch units.

29. The method according to claim 14, wherein in the lithium metal oxide, the average oxidation state N of the dopants is about +3.

* * * * *

UNITED STATES PATENT AND TRADEMARK OFFICE
CERTIFICATE OF CORRECTION

PATENT NO. : 6,589,499 B2
DATED : July 8, 2003
INVENTOR(S) : Gao et al.

It is certified that error appears in the above-identified patent and that said Letters Patent is hereby corrected as shown below:

Title page,
Item [75], Inventor, should include: -- John F. Engel, Belmont, NC (US) --
Item [56], References Cited, FOREIGN PATENT DOCUMENTS, second reference should read -- DE  44 35 117 C1 5/1996 --

Column 9,
Line 22, should read -- $\beta + \gamma = 1$, said compound having a substantially single phase, --

Signed and Sealed this

Thirteenth Day of July, 2004

JON W. DUDAS
*Acting Director of the United States Patent and Trademark Office*